US008055700B2

(12) United States Patent
Rhoda et al.

(10) Patent No.: US 8,055,700 B2
(45) Date of Patent: Nov. 8, 2011

(54) NETWORK TEST/MEASUREMENT AGENT EXTENSIBLE WITH DIFFERENT TYPES OF NETWORK INTERFACES

(75) Inventors: Merlin A. Rhoda, Reno, NV (US); Scott A. Blomquist, Colorado Springs, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 1785 days.

(21) Appl. No.: 10/697,270

(22) Filed: Oct. 31, 2003

(65) Prior Publication Data

US 2005/0097193 A1    May 5, 2005

(51) Int. Cl.
*G06F 15/16* (2006.01)

(52) U.S. Cl. ........................................ 709/202; 709/203

(58) Field of Classification Search .................. 709/202, 709/203
See application file for complete search history.

(56) References Cited

U.S. PATENT DOCUMENTS

| 7,010,598 | B2* | 3/2006 | Sitaraman et al. | 709/224 |
| 7,231,555 | B2* | 6/2007 | Barnard et al. | 714/47 |
| 7,316,000 | B2* | 1/2008 | Poole et al. | 717/104 |
| 7,433,941 | B1* | 10/2008 | Lavian et al. | 709/223 |
| 7,817,645 | B2* | 10/2010 | Diomelli | 370/401 |
| 2002/0091501 | A1* | 7/2002 | Durbin et al. | 702/188 |
| 2003/0041311 | A1* | 2/2003 | Poole et al. | 717/100 |
| 2004/0136327 | A1* | 7/2004 | Sitaraman et al. | 370/252 |
| 2004/0205691 | A1* | 10/2004 | Poole et al. | 717/100 |
| 2005/0107990 | A1* | 5/2005 | Monk et al. | 702/188 |
| 2007/0218893 | A1* | 9/2007 | Tatman et al. | 455/423 |

* cited by examiner

*Primary Examiner* — Mohamed Wasel
(74) *Attorney, Agent, or Firm* — Matthew A. Pequignot; Pequignot + Myers LLC (57) ABSTRACT

A system or method that extends a communication test/measurement agent by providing the communication test/measurement agent with built-in functionality to allow a central communication test/measurement system to generically communicate with and operate the agent, and by providing the communication test/measurement agent with built-in functionality to allow the agent to automatically recognize and dynamically incorporate plugins that are specific to different types of communication interfaces and which allow the network test/measurement system to communicate with the respective different types of communication interfaces.

12 Claims, 6 Drawing Sheets

NETWORK TEST/MEASUREMENT AGENT EXTENSIBLE WITH DIFFERENT TYPES OF NETWORK INTERFACES

BACKGROUND OF THE INVENTION

1. Field of the Invention

The present invention is directed to the field of network agents for testing and measuring networks. More particularly, the present invention is directed to a network agent designed to communicate with a network test and management system and which can be dynamically expanded to communicate with additional interfaces without being redesigned or recoded; where the agent can be dynamically augmented with functionality for allowing the network test and management system to communicate with different types of interfaces added to the agent.

2. Description of the Related Art

Previous network agents used in a communications testing and measurement system have been designed and written specifically hardcoded to work with certain limited types of voice or network devices. A network test or troubleshooting center system (NTC) may need to communicate with various types of network devices or agents, such as a network analyzer agent, probe, a voice quality testing device, a router, and so on. Previously, these devices have been designed specifically for one type of interface. The NTC will communicate with the different types of agents independently. To date, designers of network test and measurement systems have had to redesign and recode a network agent for each new type of interface to be added to the agent and users have not been able to incrementally install different interfaces for operation with one agent.

What is needed is a method and system for extending network agents in a test and measurement setting to handle newly installed interfaces of different types without having to be redesign and recode the agents.

SUMMARY OF THE INVENTION

It is an aspect of an embodiment described herein to provide a communication test/measurement agent that can be dynamically extended to communicate with different types of communication interfaces or application programs that drive them.

It is another aspect of an embodiment described herein to provide a communication test/measurement system with an extensible application programming interface (API) that can be extended to accommodate dynamically added communication interfaces.

It is yet another aspect of an embodiment described herein to provide a test/measurement agent that can provide programmatic access to different communication interfaces of different types on a single network device or analyzer (or interfaces in communication with the agent).

It is still another aspect of an embodiment described herein to provide a single network access point through which a network test/measurement/management system can access or control and operate the network test/measurement functionality of different types of network test/measurement applications and their corresponding communication interfaces.

It is another aspect of an embodiment described herein to provide a network agent architecture that can be extended by third parties.

The above aspects can be attained by a system or method that extends a communication test/measurement agent by providing the communication test/measurement agent with built-in functionality to allow a central communication test/measurement system to generically communicate with and operate the agent, and by providing the communication test/measurement agent with built-in functionality to allow the agent to automatically recognize and dynamically incorporate plugins that are specific to different types of communication interfaces and which allow the network test/measurement system to communicate with the respective different types of communication interfaces. These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Typically, network operators use network test/monitor devices (test devices) to test/monitor data communication (traffic) of a network under test. Network probes, remote monitors, etc. are examples of test devices. The test devices can be controlled locally via a local command-driven interface and/or a graphical user interface with data input from a keyboard and/or a display. Some test devices may not have a graphical command line interface and are controlled via an API. The network operators can also control the test devices remotely by using an Application Programming Interface (API) provided by a vendor (manufacturer) of the test devices. In particular, the network operators (i.e., customers of the test devices) use the API to develop/build test software applications regarding the network traffic by exchanging, via the API, test device commands that remotely control the test devices to perform various testing/monitoring/measurement. U.S. application Ser. No. 10/224,556, entitled a "SYSTEM CONTROLLING TEST/MEASUREMENT DEVICES ON A NETWORK USING MARKUP LANGUAGE DOCUMENTS AND METHODS THEREOF", filed on Aug. 21, 2002, by Merlin Rhoda and John Monk, and which is incorporated by reference herein, discusses how to remotely control a network device using an application programming interface technology layered between a central test system or client/console thereof that is run by a network operator. Following is a description of how to implement an extensible agent to match API communications with corresponding interfaces, where new interfaces may be dynamically added or attached to the agent without having to recode or redesign the agent.

Figure 1:
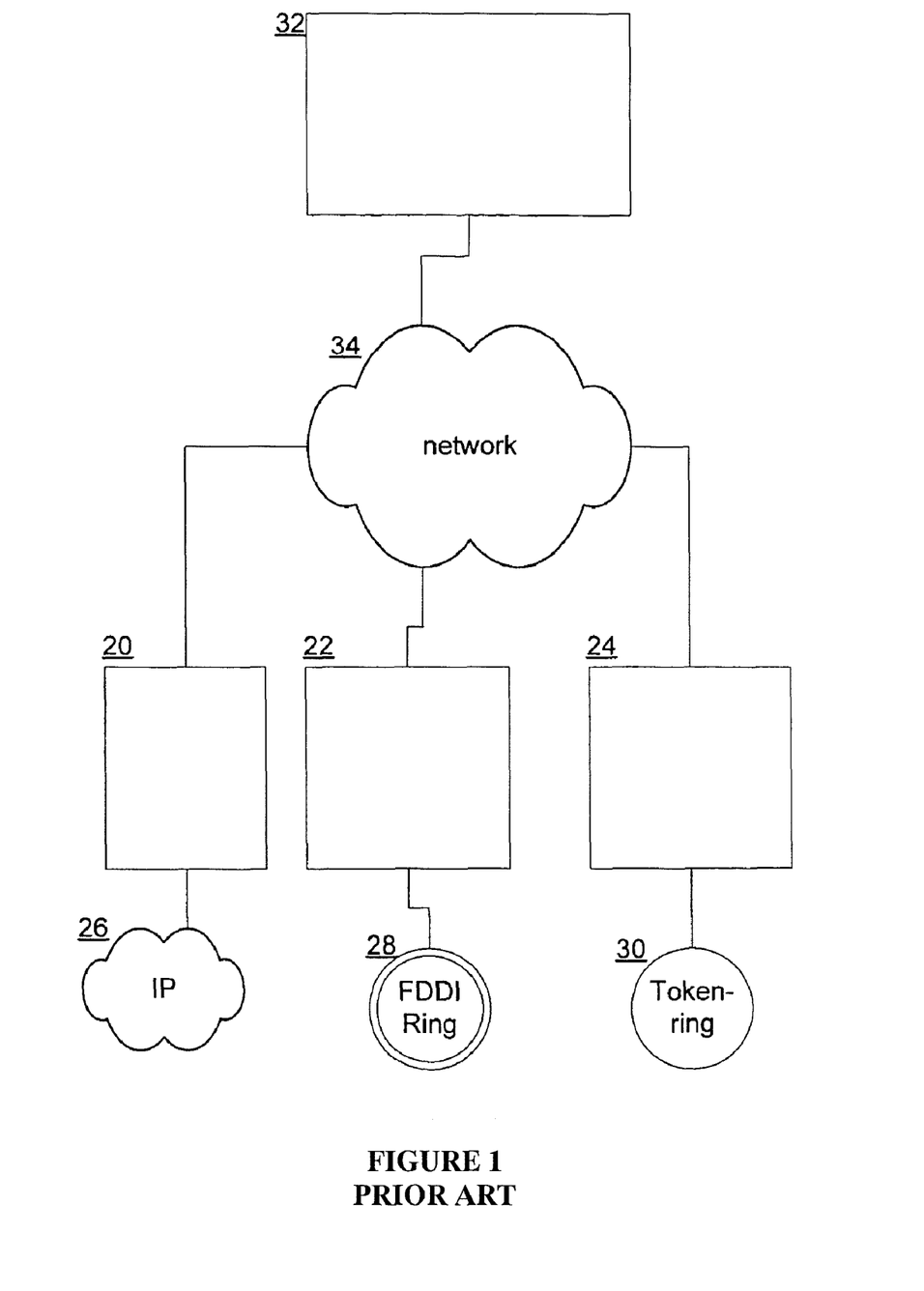
FIG. 1 shows a typical communications test/measurement setting.

FIG. 1 shows a typical communications test/measurement setting. In the past, network testing has been accomplished with disparate network test devices such as test devices 20, 22, and 24. Network test devices 20, 22, and 24 communicate with networks 26, 28, and 30 and perform various tests, measurements, and/or monitoring of data on the test networks 26, 28, and 30. Typically, each test unit is a computer or any computing device (e.g., desktop, portable, handheld, etc.) that can communicate with and test a network and test a network by, for example, receiving, transmitting, storing, displaying, and processing information using conventional techniques. In particular, a test unit typically executes software performing typical testing/monitoring of data exchange/network traffic on a test network and/or measurement functions relating to data exchange/network traffic on the networks 26, 28, and 30. Example test units 100 include (without limitation) voice quality testers (VQTs) monitoring Real-Time Transport Protocol (RTP) packets to determine end-to-end voice quality, distributed network analyzers (DNAs) analyzing communication protocols and/or logic analyzers. As will be seen below, test units or devices need not be autonomous hardware units, but may be a communication interface paired with an application program (as mentioned later). Test units are available from Agilent Technologies, Inc., Palo Alto, Calif., assignee of the present patent. Central network test or management systems 32 have been limited in their ability to remotely use network test devices, for example over a network 34.

Figure 2:
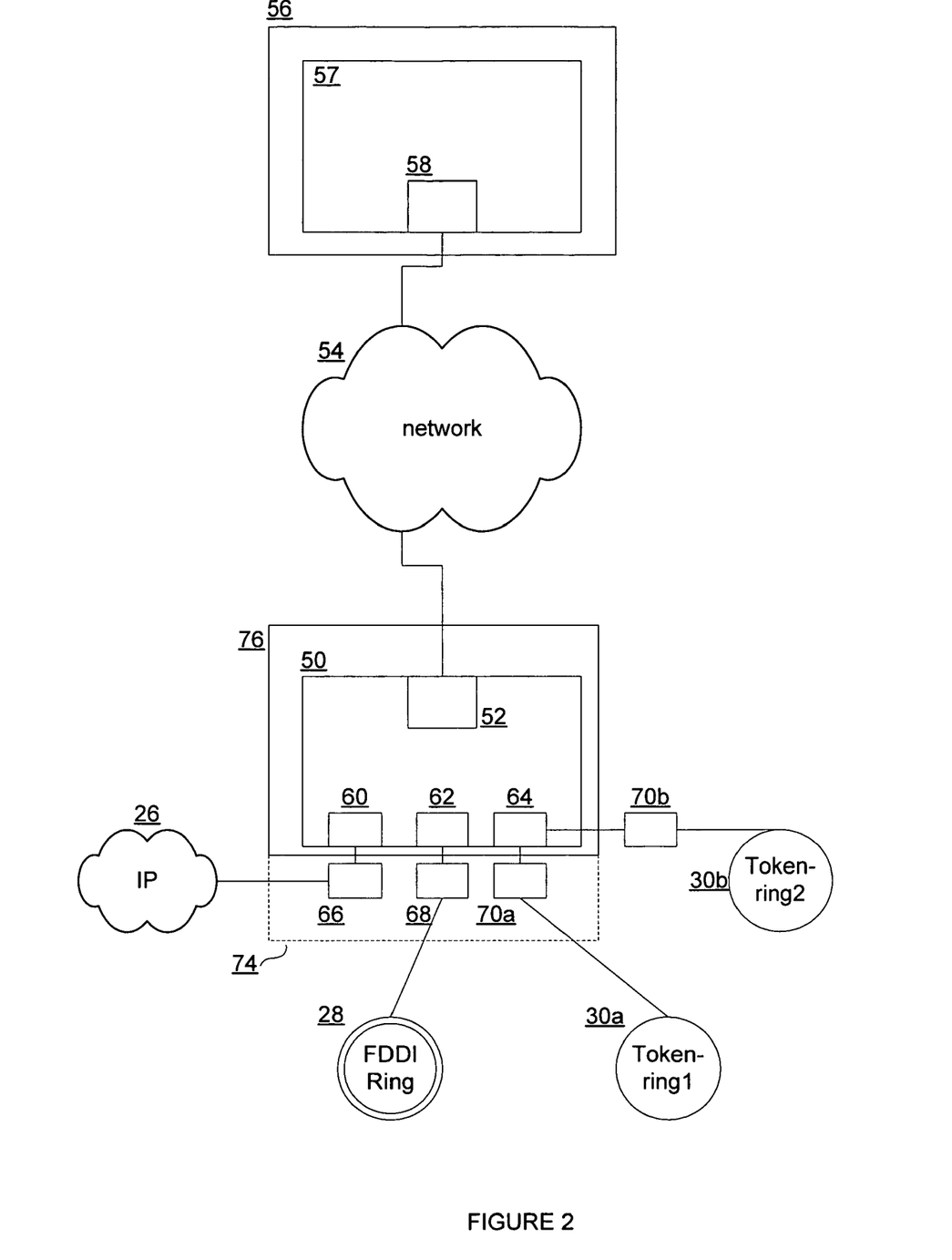
FIG. 2 shows a network agent.

FIG. 2 shows a network agent. The network agent 50 is provided with a communication unit 52 to communicate, via network 54, with a network test center (NTC) system 56 and console/client 57, which also has a communication unit 58 analogous to communication unit 52. Although shown as a part of the NTC, the console/client can be separate from the NTC. The communication units 52 and 58 preferably exchange requests and responses in the form XML documents, which are transmitted using HTTP. The network agent 50 also has code or interface-type specific functionality 60, 62, and 64 to handle requests/responses to/from different types of test units 66, 68, 70*a*, and 70*b*, which may be communication interfaces and/or application programs or drivers paired therewith. The test units provide network test/monitor data and control for their respective communication interfaces which are for communicating with their respective networks 26, 28, 30*a*, and 30*b*. As indicated by dotted line 74, a test unit and/or interface thereof may reside either on a device 76 that hosts the agent 50, or they may reside elsewhere such as on a shared subnet, etc. The host device 76 may be, for example, a headless PC or the like. Although referred to as a "network" agent, the network agent 50 can function in both data networks and other types of networks such as telephone networks.

Figure 3:
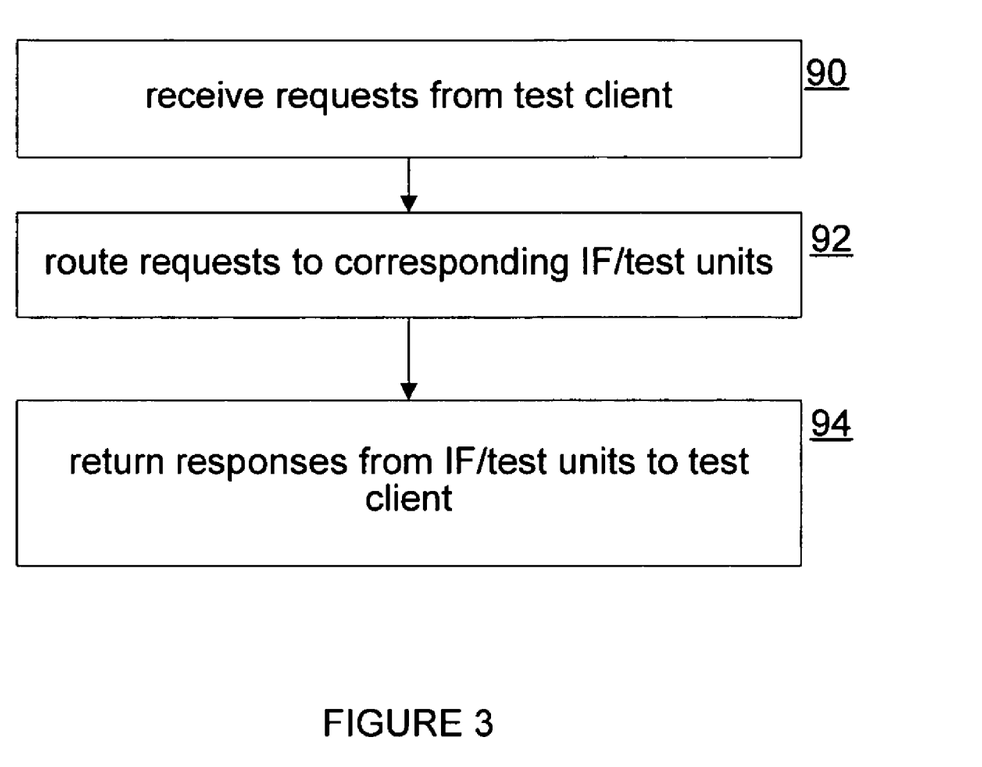
FIG. 3 shows a process of a network agent 50.

FIG. 3 shows a process of a network agent 50. Before the process begins, a network operator will preferably have used a graphical user interface of the client or console 57 to select the network agent 50 from among various network entities attached to or managed by the NTC 56. Selecting the network agent 50 will reveal interfaces or test units attached to the network agent 50. A test unit or interface is selected for communication or operation from the console or client 57. Or, the network agent 50 may be selected as the subject to be communicated with. The network agent will receive 90 requests over network 54 from the test client or console 57. The requests are preferably XML documents formatted according to an established API. An incoming request is routed 92 to a corresponding test unit or interface to which it corresponds. Or, if the request is not directed to a specific interface but rather to the network agent 50, the network agent 50 will itself process the request and generate a response if needed. Finally, the network agent 50 will return 94 any response from an interface or test unit using the same API communication path used for the request, for example the path from communication unit 52, to network 54, to communication unit 58. In effect, the network agent 50 provides a programmatic or automated means of connecting to several different test units, interfaces, or application-interface pairings, which allows collection of data from them, storing the data, etc. all with from a single access point such as a client or console 57. Multiple types of interfaces or test units can be viewed and their data can be correlated by one person at one location for example at the location of the NTC.

Figure 4:
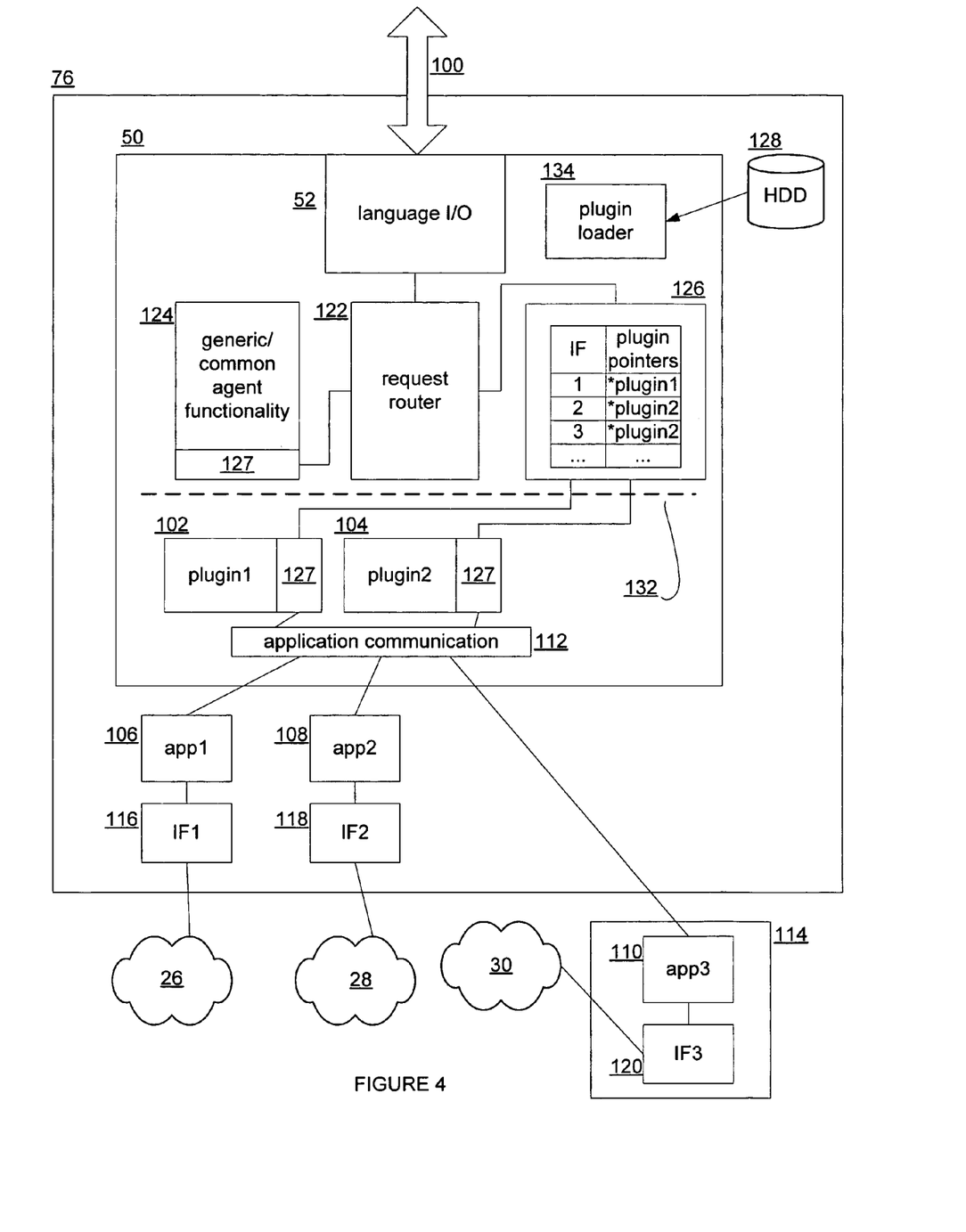
FIG. 4 shows a detailed view of an embodiment of an extensible network agent.

FIG. 4 shows a detailed view of an embodiment of an extensible network agent. In one embodiment the network agent is extensible in that in can be dynamically expanded to accommodate additional applications/interfaces. Preferably, this may be accomplished by providing the agent with a generic part/aspect and an agent-plugin interface to allow it to talk to multiple types of equipment by simply writing new plugins for the agent. This can greatly improve the efficiency of managing the agent software. For example, a vendor might ship out a network analyzer agent and may later come out with a different type of interface and corresponding application plugin to run on that same agent. A customer may initially only purchase a particular VQT application and the network agent may be delivered or deployed with only a core functionality and functionality or extensions for the VQT application. If the customer later decides to install a network analyzer application and/or test unit, it is now possible to install an extension or plugin for the network analyzer without reprogramming the network agent. If the network analyzer application resides on the host 76 of the network agent, then the application and extension therefor can be installed together at one time. As discussed in more detail below, the extension or plugin can be dynamically installed and incorporated into the agent, which thereby dynamically extends the network agent.

In the network agent embodiment shown in FIG. 4, the agent 50 is preferably provided with a communication unit 52 for language I/O, that is to say, software for sending and receiving API communications 100, such as XML documents. The agent will have plugin objects 102 and 104 that will handle requests for test/monitor driver applications, such as applications 106, 108, and 110. An application communication unit 112, such as a CORBA pipeline, may be provided to plugins to communicate with their respective applications. Interprocess communication or communication without communication unit 112 is also possible. As seen in FIG. 4, an application may run a device 76 that is hosting the agent 50 (e.g. applications 106 and 108), or an application (e.g. application 110) may run over a network on another device 114 (e.g. a network probe). Preferably, each application will have a communication interface 116, 118, and 120, which are in communication with their respective networks 26, 28, 30, which may be being tested or monitored through the agent 50. Applications and interfaces not on the agent's device 76 may be discovered automatically by sending a broadcast message.

The agent 50 preferably has a request router object 122, a generic agent object 124 (or functionality commonly handled by the agent 50), and an interface table 126. The request router (or equivalent functionality of the agent) routes communications between the communication unit 52, the generic agent object, and—via the interface table 126—the plugin objects 102 and 104. The interface table 126 keeps track of which interfaces are attached to the agent 50 and which plugin corresponds to which interface. Plugins are preferably designed for a type of communication interface and one plugin can handle the communications of more than one interface of that type. For example, in FIG. 4 the interface table 126 maps interface2 (IF2) 118 and interface3 (IF3) 120 to the plugin2 104. In general, the agent 50 operates by receiving requests 100, directing them to a plugin (e.g. plugin 102 or 104), or to a generic responder (e.g. agent object 124), in accordance with the request 100. The generic agent object 124 handles a request and generates a response that is sent back through the communication unit 52. Depending on the nature of a request, the plugin objects 102 or 104 handle a request by either independently and/or by forwarding the request to the interface that is the subject of the request. The plugin object 102 or 104 sends back a response accordingly.

The agent 50 or document/request router 122 can route documents/messages by referring to common parts of a message to determine which interface a message is intended for. The agent 50 or request router 122 then passes the message to the plugin specific to that type of interface. For convenience, it is preferable to provide the generic agent object and the plugin objects with a common interface object 127, which facilitates communication within the agent 50 and with the application communication unit 112. The generic functionality may include functions such as exclusionary locking/unlocking of interfaces, queries for available interfaces, etc. The plugins may perform functions such as caching information of the interface, some of the locking, forwarding messages to respective applications/interfaces, etc.

The dashed line 132 indicates a division between the base functions of the agent 50 and the extensible portions of the agent 50. The agent is preferably initially provided with the base or common components such as the communication unit 52 (e.g. an XML servlet), an agent plugin loader 134, the generic agent object 124, and the interface table 126. The agent 50 may then be extended with extensible portions such as the plugin objects, XML schemas, or other information that may be used to dynamically hook extensions and/or plugin objects into the originally coded agent 50.

In a preferred embodiment, incoming XML documents 100 will have verbs that are in a language or verb set implemented by the agent 50. The agent 50 will process generic types of verbs that are not specific to a particular plugin or interface thereof. The plugins (or applications in communication therewith) will preferably implement those verbs in the language that are not implemented by the agent 50. In a preferred embodiment, where the language is implemented with XML, the agent 50 will use XML schemas to define the language that it implements. A base schema can define the verbs implemented by the agent itself (e.g. the verbs handled by the generic agent object 124). When a new plugin is added by the loader 134, the loader 134 or agent 50 will merge a corresponding new schema with the existing schema(s), thus dynamically extending the language recognized and implemented by the agent and its applications. A diskdrive (HDD) 128 or other storage (including a network storage) may be used to store schemas, software for the agent and plugins, applications that reside on the agent's device 76, etc. Of note is the extensibility, in that whenever a command comes into the agent 50, the generic agent portion attempts to handle it first, and if it is not part of the generic agent's vocabulary or if the generic agent knows that it must rely on an agent plugin to process part of the command, then that command, is directed to the appropriate extension or plugin (preferably by referring to an interface key or identifier in the command).

Figure 5:
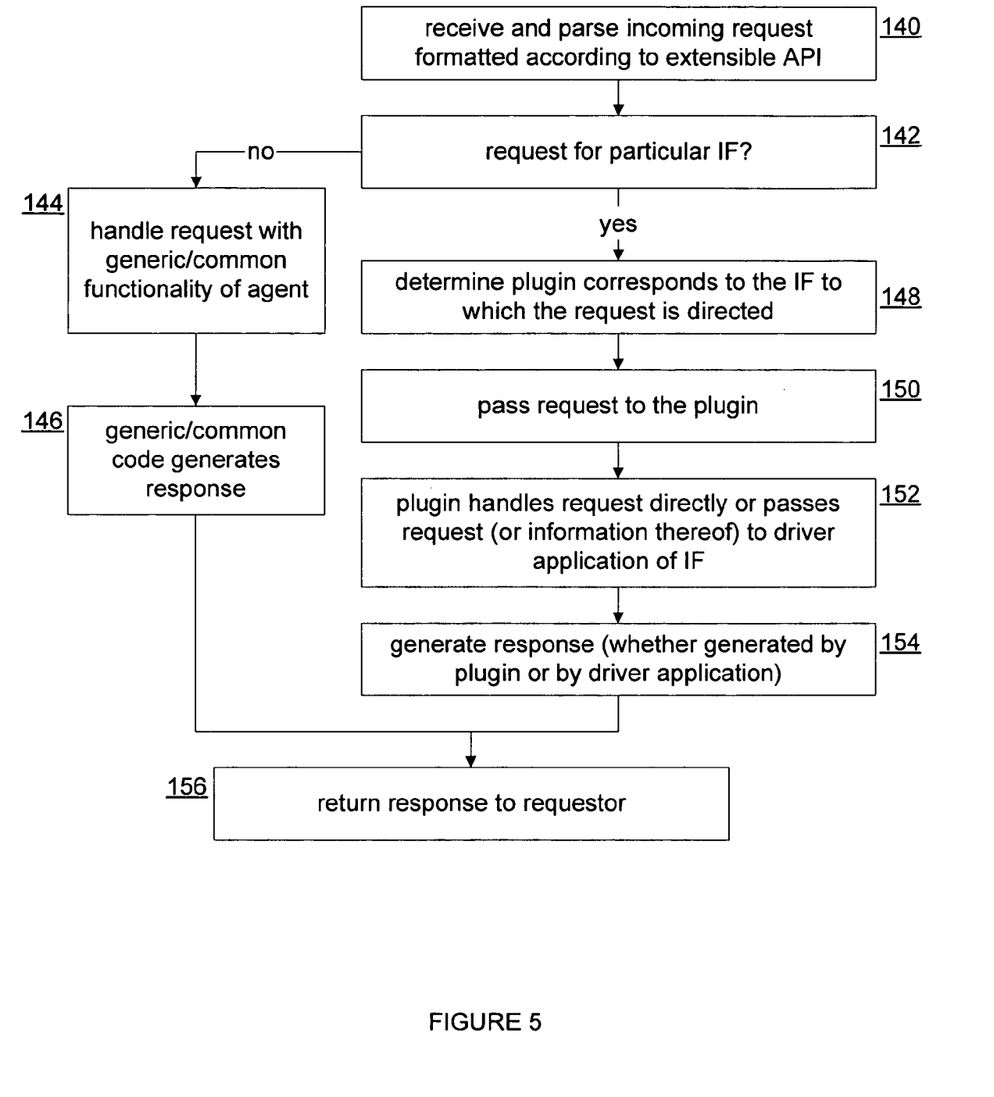
FIG. 5 shows a process according to the agent embodiment shown in FIG. 4.

FIG. 5 shows a process according to the agent embodiment shown in FIG. 4. The agent 50 receives 140 and parses an incoming request that is formatted according to an extensible API. The agent 50 decides 142 if the request is for a particular interface, plugin, application, etc. or more simply if the request is a generic command. If it is not, then the agent 50 handles the request with generic/common functionality of the agent 50, for example using the generic agent object 124. In other words, if it is not a generic command, then the request is checked for information about a specific interface, and then the request is routed to that interface or its corresponding plugin. This generic/common code or portion of the agent 50 generates 146 a response. If the request is for a particular interface, plugin, application, etc. then the agent 50 preferably determines 148 which plugin corresponds to the interface to which the request is directed, and the request (or information derive therefrom) is passed 150 to the determined plugin. A response is generated 154 by either the plugin or by an application driver of the interface targeted by the request, and finally a response is returned 156 to the requestor.

Figure 6:
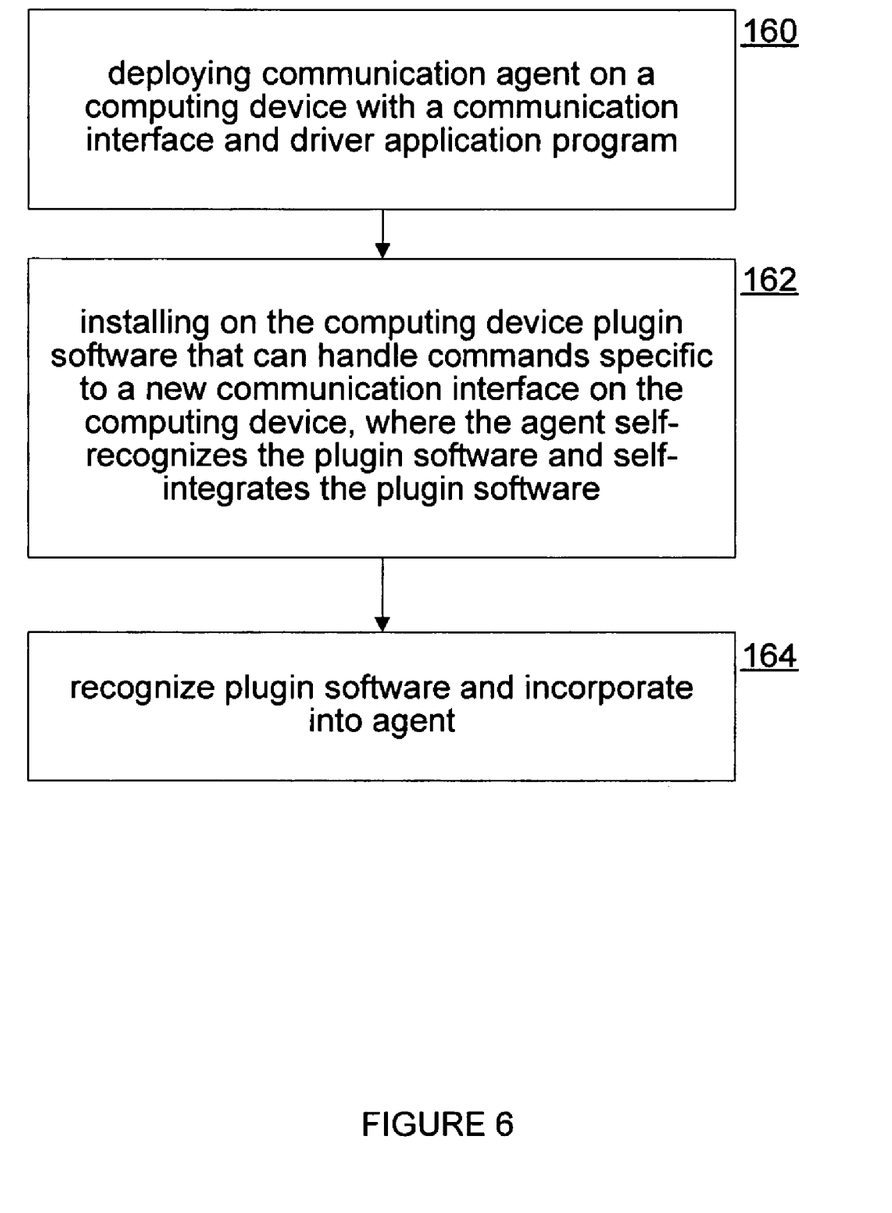
FIG. 6 shows a process for extending a network agent.

FIG. 6 shows a process for extending a network agent. Initially a user deploys 160 a communication agent on a computing device with a communication interface and driver application program. Then, perhaps after some period of using the communication agent and device, the user installs on the computing device plugin software that can handle commands specific to a new communication interface on the computing device, where the agent self-recognizes 160 the plugin software and self-integrates the plugin software. That is to say, the agent recognizes 164 the new plugin software and incorporates the same into the agent.

An example of a practical application of an agent 50 follows. Initially a user acquires a PC with a network interface card and some preloaded software (e.g. an XML/HTTP communication component) for connecting an NTC console to a single agent on the PC, and to capture data of the interface. The user later decides to add a VQT component to that PC/agent, so they acquire a VQT interface card and application software, install the VQT interface card, and load the new application software and corresponding plugin code/software onto the PC. After the new plugin is incorporated into the agent, the user can use the same NTC console or some other client to connect to the agent, which will now show two interfaces, the original network interface card and the VQT interface card, and commands can be sent to both interfaces through the agent. Therefore, the agent has dynamically extended its functionality so that it can do both voice and network tests.

According to the example above, internally the agent is extended by loading new classes for the VQT plugin onto the agent's HDD 134. When the agent is restarted, the agent notices the new classes, loads them into memory, calls some methods to determine information such as what kind of interface card they represent, and then adds the interface to the list of known interfaces (e.g. makes a new entry type and entry in the interface table). Now, when the NTC sends a command to connect to the VQT interface card, the agent software will make some calls to the interface plugin code for the VQT card, to pass down information to initialize the new interface card, and to start communications with the new interface card. Furthermore, it should be noted that neither the network card capture plugin nor the VQT plugin need to be reprogrammed, nor do they need to be specifically programmed to work in conjunction with one another. The same plugin can be reused.

Although plugin capabilities related to different interface types are discussed above, the plugin extensibility is not limited to network interfaces. Another type of plugin can be written to add new measurement capabilities to the agent, where the new measurement capabilities may correlate data from multiple interfaces (thus the measurement capability does not belong in the interface plugin). For example, a plugin could be written to search for traffic between two endpoints in the network. Plugins can be used to add any type of functionality to the network agent, which can include functions related to the attached interfaces. Furthermore, some requests might be serviced by both plugins and the generic portion of the agent. For example, if the agent needs interface information, the generic portion can query each of the plug-ins to form a list of some or all of the available interfaces.

Finally, it should be noted that the NTC mentioned above is not a critical portion of the extensible agent. Some users may wish to use extensible agents by communicating directly with them (for example with a communication test/measurement client) instead of by using a GUI on the NTC. The NTC is mentioned for reference, is an optional part of the overall system.

The present invention has been described with respect to a system or method that extends a communication test/measurement agent by providing the communication test/measurement agent with built-in functionality to allow a central communication test/measurement system to generically communicate with and operate the agent, and by providing the communication test/measurement agent with built-in functionality to allow the agent to automatically recognize and dynamically incorporate plugins that are specific to different types of communication interfaces and which allow the network test/measurement system to communicate with the respective different types of communication interfaces.

Further background discussion on communication test and measurement, as well as details on how to implement an XML API for the same, may be found in U.S. patent application Ser. No. 10/224,556, commonly owned by the assignee of the present patent.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of extending a communication test/measurement agent, comprising:
   a) providing the communication test/measurement agent with a communication unit, which enables communication between the communication test/measurement agent and a network test center or client via a network for operating the communication test/measurement agent;
   b) providing the communication test/measurement agent with a plurality of different types of communication interfaces, each different type of communication interface for communicating with different types of networks; and
   c) providing the communication test/measurement agent with built-in functionality to enable the communication test/measurement agent to automatically recognize and dynamically incorporate a plurality of different interface-specific plugins that are specific to different types of communication interfaces and which enable the network test center or client to initiate monitoring or testing of the different types of networks, and receive test/monitor data therefrom.

2. The method according to claim 1, wherein step c) includes loading code of a plugin into the agent.

3. The method according to claim 1, wherein a plugin is recognized and incorporated after the agent has been deployed for communications test/measurement and without reprogramming the agent.

4. The method according to claim 1, wherein each plugin communicates with an application program that drives the corresponding communication interface.

5. The method according to claim 1, wherein the agent provides a basic API to the network test center or client that is independent of any communication interfaces, and wherein the plugins extend the API for the respective types of interfaces.

6. The method according to claim 1 further comprising:
   providing a request router, which determines which interface a message is intended for by referring to common parts of the message; and
   providing an interface table, which tracks which plugins correspond to which interfaces;
   wherein the request router passes the message from the communication unit to one of the plugins based on the corresponding interface from the interface table.

7. The method according to claim 5, wherein an extensible language is used to communicate with the API, wherein a base set of commands of the extensible language corresponds to the built-in functionality, and wherein the recognizing and incorporating of a plugin further comprises extending the extensible language with additional verbs that are specific to the plugin.

8. A method of communication with a plurality of network analysis software, the method comprising:
   sending a plurality of requests from a communication testing console to a communication agent for monitoring or testing a plurality of different networks;
   receiving the requests at the agent;
   directing a first one of the requests to a first communication interface, which enables communication with one of the plurality of different networks;
   directing the first request to a first plugin of the agent that is specific to the type of the first communication interface for monitoring or testing one of the plurality of different networks;
   directing a second one of the requests to a second communication interface, which enables communication with another one of the plurality of different networks;
   directing the second request to a second plugin of the agent that is specific to the type of the second communication interface for monitoring or testing the other one of the plurality of different networks; and
   directing a third one of the requests, which is not directed to a communication interface, to a common generic portion of the agent.

9. The method according to claim 8, wherein the plugin responds to the first one of the requests with a response received from an application program that drives the communication interface to which the first request is directed.

10. The method according to claim 9, wherein the common generic portion of the agent handles the third request by generating a response to the third request.

11. A method of extending a communication agent that provides a communication point for a console of a communication test/measurement system, the method comprising:
   deploying the communication agent, where the communication agent is deployed on a computing device comprising a plurality of different types of communication interfaces for communicating with a plurality of different types of networks and communicates with the communication interfaces using a driver application program, and where the console programmatically accesses the agent and accesses the communication interfaces through the agent; and after the deploying, making the deployed communication agent aware of a new communication interface by installing on the computing device plugin software that can handle commands specific to the new communication interface, where the agent self-recognizes the plugin software and self-integrates the plugin software, whereby the plugin software becomes part of the agent and enables the console to send commands to the new communication interface for monitoring or testing each of the different networks.

12. A non-transitory machine-readable storage device for storing information enabling a network test/measurement agent to perform a process, the process comprising:

deploying the communication agent, where the communication agent is deployed on a computing device comprising a plurality of different types of communication interfaces for communicating with a plurality of different types of networks and communicates with the communication interfaces using a driver application program, and where the console programmatically accesses the agent and accesses the communication interfaces through the agent; and after the deploying, making the deployed communication agent aware of a new communication interface by installing on the computing device plugin software that can handle commands specific to the new communication interface, where the agent self-recognizes the plugin software and self-integrates the plugin software, whereby the plugin software becomes part of the agent and enables the console to send commands to the new communication interface for monitoring or testing each of the different networks.

* * * * *